United States Patent
Grundei et al.

(10) Patent No.: US 10,483,563 B2
(45) Date of Patent: Nov. 19, 2019

(54) CATHODE SUPPLY FOR A FUEL CELL

(71) Applicant: Volkswagen AG, Wolfsburg (DE)

(72) Inventors: Daniel Grundei, Braunschweig (DE); Christian Schlitzberger, Schoenebeck (DE); Christian Lucas, Braunschweig (DE); Hannes Scholz, Braunschweig (DE); Jan-Philipp Brinkmeier, Braunschweig (DE)

(73) Assignees: Volkswagen AG, Wolfsburg (DE); Audi AG, Ingolstadt (DE)

(*) Notice: Subject to any disclaimer, the term of this patent is extended or adjusted under 35 U.S.C. 154(b) by 458 days.

(21) Appl. No.: 15/342,835

(22) Filed: Nov. 3, 2016

(65) Prior Publication Data
US 2017/0125827 A1 May 4, 2017

(30) Foreign Application Priority Data

Nov. 4, 2015 (DE) .................. 10 2015 221 597

(51) Int. Cl.
*H01M 8/04* (2016.01)
*H01M 8/04082* (2016.01)
*H01M 8/04089* (2016.01)
*H01M 8/04111* (2016.01)
*H01M 8/04119* (2016.01)
*B60L 50/72* (2019.01)
*B60L 58/32* (2019.01)

(52) U.S. Cl.
CPC ......... *H01M 8/04201* (2013.01); *B60L 50/72* (2019.02); *B60L 58/32* (2019.02); *H01M 8/04089* (2013.01); *H01M 8/04111* (2013.01); *H01M 8/04134* (2013.01); *H01M 8/04141* (2013.01); *H01M 2250/20* (2013.01); *Y02T 90/32* (2013.01); *Y02T 90/34* (2013.01)

(58) Field of Classification Search
CPC ......... H01M 8/04201; H01M 8/04089; H01M 8/04111; H01M 8/44134; H01M 8/04141; H01M 2250/20
See application file for complete search history.

(56) References Cited

U.S. PATENT DOCUMENTS 7,344,787 B2  3/2008  Formanski et al.

FOREIGN PATENT DOCUMENTS

| DE | 102004051359 |    | 6/2005 |
|----|--------------|----|--------|
| DE | 102010001221 |    | 7/2011 |
| DE | 102011109339 |    | 2/2013 |
| DE | 102011114720 | A1 | 4/2013 |

*Primary Examiner* — Jane J Rhee
(74) *Attorney, Agent, or Firm* — Davidson, Davidson & Kappel, LLC

(57) ABSTRACT

A cathode supply (30) for a fuel cell (10) of a fuel cell unit (1) for a fuel cell system is provided, the cathode supply (30) including a cathode supply path (31) and a cathode exhaust gas path (32) and at least two fluid pumping devices (33, 133) for pumping a cathode operating medium (5) for the fuel cell (10) are fluido-mechanically coupled into the cathode supply path (31), at least one first fluid pumping device (133) of the at least two fluid pumping devices (33, 133) being drivable only on the basis of an enthalpy in a cathode exhaust gas (6) of the fuel cell (10). A fuel cell unit for a vehicle, in particular, an electric vehicle, a fuel cell system for a vehicle, in particular, an electric vehicle, or a vehicle in particular an electric vehicle, the fuel cell unit, the fuel cell system, or the vehicle including a cathode supply (30) is provided.

22 Claims, 3 Drawing Sheets

CATHODE SUPPLY FOR A FUEL CELL

This claims the benefit of German Patent Application DE102015221597.0, filed Nov. 4, 2015 and hereby incorporated by reference herein.

The present invention relates to a cathode supply for a fuel cell of a fuel cell unit for a fuel cell system. Furthermore, the present invention relates to a fuel cell unit for a vehicle, a fuel cell system for a vehicle, and/or a vehicle, in particular, an electric vehicle.

BACKGROUND

A fuel cell of a fuel cell unit of a fuel cell system uses electrochemical conversion of a hydrogen-containing (H, H2) fuel to water, using oxygen (0, 02) to generate electrical energy. For this purpose, the fuel cell contains at least one so-called membrane electrode assembly (MEA) as a core component, which is a structure of an ion-conducting, or proton-conducting membrane and electrodes situated on both sides of the membrane, an anode electrode, and a cathode electrode. In addition, gas diffusion layers (GDL) may be situated on both sides of the membrane electrode assembly on the sides of the electrodes facing away from the membrane.

In general, the fuel cell is formed by a plurality of membrane electrode assemblies arranged in a stack, their electrical powers being combined during operation of the fuel cell. Bipolar plates, also known as flow field plates or separator plates, are usually situated between the individual membrane electrode assemblies, which ensure supply of operating media, known as reactants, to the membrane electrode assemblies, i.e., supply to the individual cells of the fuel cell, also usually serving as coolants. In addition, the bipolar plates ensure an electrically conductive electrical connection to the adjacent membrane electrode assemblies.

During operation of the individual cells of the fuel cell (individual cell: membrane electrode assembly and an associated anode space delimited by a bipolar plate and an associated cathode space delimited by a second bipolar plate), the fuel, a so-called anode operating medium, is fed to the anode electrodes via a flow field of the bipolar plate, open on the anode side, where an electrochemical oxidation of $H_2$ to $2H^+$ takes place ($H_2 \Rightarrow 2H^+ + 2e^-$) with the release of electrons ($2e^-$). Water-bound or water-free transport of the formed protons ($H^+$), from the anode electrodes ((complex) anode of the fuel cell), in the anode spaces of the individual cells to the cathode electrodes ((complex) cathode of the fuel cell) in the cathode spaces of the individual cells takes place through the membranes or electrolytes of the membrane electrode assemblies, which gas-tightly separate and electrically insulate the respective reaction spaces (anode space-cathode space pairs of the individual cells).

The electrons provided on the anode are conducted to the cathode via an electrical conductor and an electrical consumer (electric traction motor, AC unit, etc.). An oxygen-containing cathode operating medium is fed to the cathode electrodes of the cathode via a flow field of the bipolar plates open on the cathode side, a reduction from $O_2$ to $2O^{2-}$ taking place with the reception of electrons ($\frac{1}{2}O_2 + 2e^- \Rightarrow O^{2-}$). At the same time, the oxygen anions ($O^{2-}$) formed at the cathode electrodes react with the protons transported through the membranes or electrolytes, with the formation of water ($O^{2-} + 2H^- \Rightarrow H_2O$)

In order to supply a fuel cell stack, henceforth referred to mainly as fuel cell, with the operating media, the fuel cell has on the one hand, an anode supply and, on the other hand, a cathode supply. The anode supply has an anode supply path for feeding the anode operating medium into the anode spaces of the fuel cell and an anode exhaust gas path for removing an anode exhaust gas from the anode spaces. Similarly, the cathode supply has a cathode supply path for feeding the cathode operating medium into the cathode spaces of the fuel cell and a cathode exhaust gas path for removing a cathode exhaust gas from the cathode spaces.

For operating the fuel cell system, oxygen must be provided as cathode operating medium, mostly in the form of ambient air. Depending on the mode of operation of the fuel cell system, the air must be supplied compressed to a certain fluid pressure above the ambient air pressure (approximately 1 bar and less) and at a certain air mass flow rate. In particular, at comparatively high air masses and comparatively high fluid pressures, this is no longer feasible using a single one-stage fluid pumping device. In modern fuel cell units, an electrically driven turbocharger, known as electric turbocharger, is used. The electric turbocharger is the largest parasitic consumer in the fuel cell system.

Furthermore, the cathode exhaust gas of the fuel cell system has a certain energy content due to its temperature level and its pressure level. This energy may be recovered using a turbine, for example. Modern passenger car systems have a power class of 70 kW to 100 kW. Accordingly, components and modules are available for this power class. Scaling a fuel cell system for passenger cars or other vehicles to powers of 120 kW to 180 kW, for example, and more [is] presently not known. Furthermore, a plurality of exhaust gas turbochargers or electric turbochargers and/or suppliers for the same, are not available for fuel cell units as they are for other motors such as internal combustion engines.

SUMMARY OF THE INVENTION

This entails significant disadvantages for high-powered fuel cell units such as, for example, comparatively large and/or comparatively cost-intensive components, which result in comparatively large and/or comparatively cost-intensive fuel cell systems. Corresponding modules, in particular, turbines and compressors, are presently not available for such fuel cell units and had to be developed from scratch; such a module has low efficiency in a partial load operational range. The fuel cell is therefore not operated at a largely optimal operating point. The modules of the fuel cell unit must be overdimensioned and would operate in their upper load ranges and would be fully utilized only during a fraction of their service life. The response times and/or the dynamics of these modules are also reduced due to their size.

DE 10 2011 114 720 A1 describes a cathode supply for a fuel cell including at least one first air pumping device, the first air pumping device being drivable at least partially by an electric motor, using a voltage level of the fuel cell. Furthermore, the cathode supply includes a second air pumping device, the second air pumping device being connected fluido-mechanically in series to the first air pumping device, and the second air pumping device being drivable by an electrical low-voltage level.

It is an object of the present invention is to scale fuel cell units of fuel cell systems of different power classes, using synergy effects similar to those of presently commercially available components, for internal combustion engines, for example.

Overdimensioning of corresponding new modules to be used and/or already present, in particular, of a turbine and/or a compressor, should be avoided. Furthermore, the fuel cell unit according to the present invention should have a comparatively high efficiency and be able to operate at a largely optimum operating point comparatively often.

The present invention provides a cathode supply for a fuel cell of a fuel cell unit for a fuel cell system, a fuel cell unit for a vehicle, a fuel cell system for a vehicle, and/or a vehicle, in particular, an electrical vehicle.

The cathode supply according to the present invention includes a cathode supply path and a cathode exhaust gas path, at least two fluid pumping devices for pumping a cathode operating medium for the fuel cell being fluido-mechanically coupled into the cathode supply path, and at least one first fluid pumping device of the at least two fluid pumping devices being drivable only on the basis of an enthalpy in a cathode exhaust gas of the fuel cell. The fluid pumping device is used for increasing the fluid pressure of the cathode operating medium and/or for increasing a mass flow rate of the cathode operating medium.

The first fluid pumping device is drivable exclusively fluido-mechanically by the cathode exhaust gas, since the fuel cell has a certain energy content or a certain enthalpy, recoverable according to the present invention, due to its temperature level and its pressure level in the cathode exhaust gas. In some exemplary embodiments, the fluid pumping device is designed as a compressor, a cathode compressor, a pump, etc. The present invention provides a simple scalability of a fuel cell unit or a fuel cell system.

In some exemplary embodiments, at least one second fluid pumping device of the at least two fluid pumping devices is drivable by an electric motor, the second fluid pumping device being drivable exclusively by an electric motor or by the electric motor and additionally by a turbine, in particular, a cathode turbine. This means that the second fluid pumping device is drivable electromechanically and, if necessary, also fluido-mechanically with the aid of an exhaust gas, in particular, of the cathode exhaust gas. In some exemplary embodiments, the cathode supply includes an exhaust gas turbocharger and an electric turbocharger, the exhaust gas turbocharger including the first fluid pumping device and the electric turbocharger including the second fluid pumping device.

In some exemplary embodiments, the first fluid pumping device is designed as a first cathode compressor of the exhaust gas turbocharger, the first cathode compressor being preferably drivable by a cathode turbine of the exhaust gas turbocharger, and the cathode turbine being fluido-mechanically coupled into the cathode exhaust gas path. Here again, the first cathode compressor of the exhaust gas turbocharger is fluido-mechanically coupled into the cathode supply path. The cathode turbine may be designed as a cathode turbine having a variable turbine geometry. Furthermore, the first cathode compressor and the cathode turbine of the exhaust gas turbocharger may also be coupled to each other rotatorily, i.e., mechanically, via a shared shaft or via a transmission.

In some exemplary embodiments, two fluid pumping devices of the at least two fluid pumping devices are connected fluido-mechanically in series or in parallel. For example, if three fluid pumping devices are provided, all three fluid pumping devices are connected in parallel or in series in some exemplary embodiments. In other exemplary embodiments, two of the three fluid pumping devices are connected in parallel, a third fluid pumping device being connected in series to these two fluid pumping devices. Furthermore, in some exemplary embodiments, two of the three fluid pumping devices are connected in series, a third fluid pumping device being connected in parallel to these two fluid pumping devices. Of course, this may be applied similarly to a plurality of fluid pumping devices.

In some exemplary embodiments, the first fluid pumping device is fluido-mechanically coupled into the cathode supply path downstream from an air filter, a wastegate, the second fluid pumping device, a humidifier, and/or a charge air cooler. The first fluid pumping device may be fluido-mechanically coupled into the cathode supply path upstream from the wastegate, the second fluid pumping device, the humidifier, and/or the charge air cooler. In some exemplary embodiments, the cathode turbine is fluido-mechanically coupled into the cathode exhaust gas path upstream or downstream from the humidifier, and/or the wastegate.

In some exemplary embodiments, the second fluid pumping device is coupled into the cathode supply path downstream from the air filter, the wastegate, the first fluid pumping device, the humidifier, and/or the charge air cooler. The second fluid pumping device may be fluido-mechanically coupled into the cathode supply path upstream from the wastegate, the first fluid pumping device, the humidifier, and/or the charge air cooler.

Furthermore, in some exemplary embodiments, the second fluid pumping device is fluido-mechanically coupled into the cathode supply path downstream from the first fluid pumping device, the first fluid pumping device being fluido-mechanically coupled into the cathode supply path preferably upstream and the second fluid pumping device preferably downstream from the humidifier, and the second fluid pumping device being preferably provided upstream from the charge air cooler in particular.

According to other exemplary embodiments, the air filter is fluido-mechanically coupled into the cathode supply path between the first and second fluid pumping device, preferably downstream from the charge air cooler and the wastegate and upstream from the humidifier.

According to the present invention, in some exemplary embodiments a reduction of a component size and/or a module size of system components such as, for example, the humidifier and/or the charge air cooler results, and thus a reduction of a necessary installation space for the fuel cell unit. Furthermore, use of standard components or components already available on the market may result, which saves costs. In addition, use of identical parts results in an increase in the number of applications of the corresponding component and again in cost reduction.

According to the present invention, in some exemplary embodiments an increase in the efficiency of the fuel cell unit results, in particular, in a partial load operational range, due to better layout options of the fuel cell unit, in particular, of the electric turbocharger. A reduction in dynamics of the electric turbocharger is possible and thus a reduction in voltage peaks and/or current peaks in an electrical traction system of the fuel cell system. Accordingly, layout and use of power electronics of the electric turbocharger are also simpler. In addition, increased flexibility results in a fluido-mechanical interconnection of the fuel cell unit.

The present invention is elucidated in greater detail below based on exemplary embodiments, with reference to the appended schematic drawing. Elements and components having an identical, univocal, or similar design and/or function are provided with the same reference numerals in the description of the figures, the list of reference numerals, and/or identified in the figures using the same reference numerals. Possible alternatives to the elucidated exemplary embodiments of the present invention, not elucidated in the description or not illustrated in the drawing, and/or not conclusive alternatives, static or kinetic inversions, combinations, etc. to the explained exemplary embodiments of the present invention or of individual modules, parts or sections thereof, may be derived from the list of reference numerals.

BRIEF DESCRIPTION OF THE DRAWINGS

All elucidated features, including those of the list of reference numerals, are applicable not only in the given combination or given combinations, but also in other combinations or by themselves. In particular, it is possible to replace one feature or a plurality of features in the description of the invention, the description of the figures, and/or the list of reference numerals with the aid of the reference numerals and the features assigned thereto. In the figures of the drawing.

DETAILED DESCRIPTION

Figure 1:
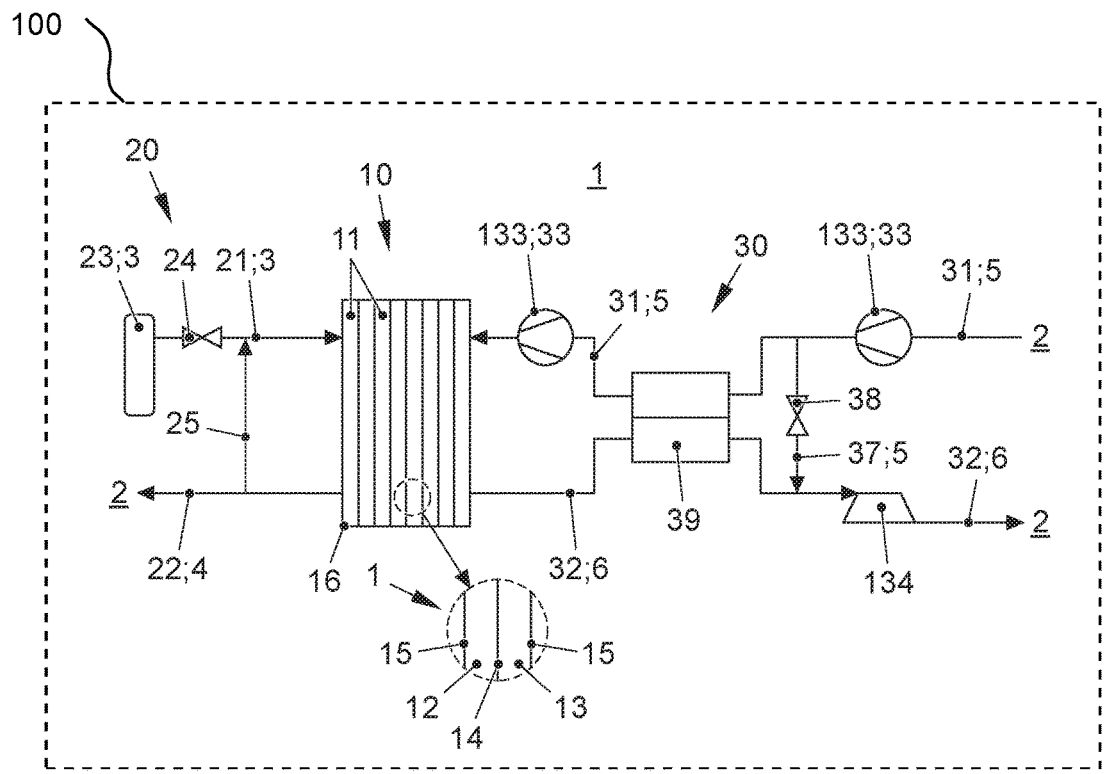
FIG. 1 shows a simplified block diagram of a preferred specific embodiment of a fuel cell unit of a fuel cell system according to the present invention.

The present invention is elucidated in greater detail with the aid of five specific embodiments of a cathode supply 30 for a fuel cell 10 of a fuel cell unit 1 for a vehicle (passenger car, passenger transport vehicle, bus, ATV, motorcycle, utility vehicle, (heavy) truck, construction vehicle, construction machine, special vehicle, rail vehicle). However, the present invention is not limited to the exemplary embodiments described below, but is of a fundamental nature, so that it may be applied to other fuel cell units, for example, of a transport system or of another means of transportation, such as an airplane, or also to transportable or stationary fuel cell units. In FIG. 1 the fuel cell unit 1 is for an electric vehicle 100, shown schematically.

The drawing shows only those sections of fuel cell unit 1 which are needed for understanding the present invention. In particular, an illustration of a periphery of fuel cell unit 1, of sensors, electronic, electrical and power electrical devices and/or systems, etc. is largely omitted. Although the present invention is described in greater detail and illustrated using preferred exemplary embodiments, the present invention is not limited by the provided exemplary embodiments. Other variations may be derived therefrom without departing from the scope of protection of the present invention.

FIG. 1 shows a fuel cell unit 1 of a fuel cell system according to one preferred specific embodiment of the present invention. Fuel cell unit 1 is preferably part of the vehicle not further illustrated here, in particular, of a motor vehicle or an electric vehicle, which preferably has an electric traction motor, which may be supplied with electrical power by a fuel cell 10 of fuel cell unit 1. The fuel cell system differs from fuel cell unit 1 in particular, by the power-electrical, electrical and electronic devices and/or systems, not illustrated in particular (transformer, battery, rectifier, etc.), an engine control unit, etc., which are not included in fuel cell unit 1.

Fuel cell unit 1 includes as one core component fuel cell 10 or a fuel cell stack 10, which preferably has a plurality of individual fuel cells 11, henceforth referred to as individual cells 11, arranged in the form of a stack, and accommodated in a preferably fluid-tight stack housing 16. Each individual cell 11 includes an anode space 12 and a cathode space 13, anode space 12 and cathode space 13 being spatially and electrically separated by a membrane (part of a membrane electrode assembly, see below), preferably of an ion conductive polymer electrolyte membrane (see detail). Fuel cell stack 10 is also simply referred to as fuel cell 10.

Anode spaces 12 and cathode spaces 13 of fuel cell 10 each have, adjacent to the membranes, a catalytic electrode (part of the corresponding membrane electrode assembly 14, see below), i.e., one anode electrode and one cathode electrode, which catalyze a partial reaction of a fuel cell conversion. The anode electrode and the cathode electrode each has a catalytic material, for example, platinum, which is preferably present supported on an electrically conductive supporting material having a comparatively large specific surface, for example, a carbon-based material.

A structure made up of a membrane and associated electrodes is also referred to as membrane electrode assembly 14. A bipolar plate 15 is also situated (in FIG. 1 only indicated) between two such membrane electrode assemblies 14 (in FIG. 1 only one membrane electrode assembly 14 is indicated), which is used for feeding operating media 3, 5 into a corresponding anode space 12 of a first individual cell 11 and into a corresponding cathode space 13 of a second individual cell 11 directly adjacent thereto, and which also implements an electrically conductive connection between the two directly adjacent individual cells 11.

An anode space 12 is formed between a bipolar plate 15 and an anode electrode of a membrane electrode assembly 14 directly adjacent thereto, and a cathode space 13 of an individual cell 11 (anode space-cathode space pair 12/13) is formed between a cathode electrode of the same membrane electrode assembly 14 and a second bipolar plate 15 directly adjacent thereto. Optionally gas diffusion layers may be situated between membrane electrode assemblies 14 and bipolar plates 15. Membrane electrode assemblies 14 and bipolar plates 15 are thus alternatingly situated or stacked (fuel cell stack 10) in fuel cell 10 or fuel cell stack 10.

For supplying fuel cell 10 or fuel cell stack 10 with operating media 3, 5, fuel cell unit 1 or the fuel cell system has, on the one hand, an anode supply 20 and, on the other hand, a cathode supply 30.

Anode supply 20 includes an anode supply path 21, which is used for feeding an anode operating medium 3 to a fuel 3, for example, hydrogen 3 or a hydrogen-containing gas mixture 3, into anode spaces 12 of fuel cell 10. For this purpose, anode supply path 21 connects a fuel storage 23 or fuel tank 23 to an anode inlet of fuel cell 10. Anode supply 20 further includes an anode exhaust gas path 22, which removes anode exhaust gas 4 from anode spaces 12 through an anode outlet of fuel cell 10. An operating pressure that has built up on an anode side of fuel cell 10 is preferably settable with the aid of a setting means 24 in anode supply path 21.

In addition, anode supply 20 preferably has a fuel recycling line 25, which fluido-mechanically connects anode exhaust gas path 22 to anode supply path 21. Recirculation of anode operating medium 3, i.e., fuel 3 to be actually preferably stored in the tank, is often set up to recycle and use anode operating medium 3 of fuel cell 10 used mostly over-stoichiometrically. Furthermore, a compressor may be provided (not illustrated) in/on fuel recycling line 25. Cathode supply 30 includes a cathode supply path 31, which feeds a cathode operating medium 5, for example, oxygen 5 or an oxygen-containing gas mixture 5, preferably air 5, which may be aspirated from surroundings 2 in particular, to cathode spaces 13 of fuel cell 10. Cathode supply 30 furthermore includes a cathode exhaust gas path 32, which removes a cathode exhaust gas 6, in particular, an exhaust air 6, from cathode spaces 13 of fuel cell 10 and feeds it to an optionally provided exhaust gas device (not illustrated).

For pumping and compressing cathode operating medium 5, at least two fluid pumping devices 33, 133 or air pumping devices 33, 133, are provided or situated in/on cathode supply path 31, i.e., fluido-mechanically coupled into cathode supply path 31. For a primary drive of two fluid pumping devices 33, 133 of the at least two fluid pumping devices 33, 133 different drive principles, in particular, a fluido-mechanical and an electromechanical drive principle, are used. See also FIGS. 2 through 6.

According to the present invention, a first fluid pumping device 133 may be driven exclusively by an energy or enthalpy carried by exhaust gas 6, i.e., exclusively fluido-mechanically. This also means that first fluid pumping device 133 has only one single drive, namely the primary drive. An additional electromechanical (electric motor) or other drive is not expressly provided for first fluid pumping device 133 according to the present invention. In some exemplary embodiments a single fluid pumping device 133 or in some exemplary embodiments, a plurality of or a majority of such first fluid pumping devices 133 are fluido-mechanically coupled into cathode supply path 31.

In some exemplary embodiments first fluid pumping device 133 is designed as a cathode compressor 133 of an exhaust gas turbocharger 100 (only shown in FIGS. 2 through 6). Cathode compressor 133 may be driven by a cathode turbine 134 (primary drive as sole drive), for example, having a variable turbine geometry; cathode compressor 133 is mechanically connected to cathode turbine 134 with the aid of a shared shaft or a transmission. Cathode compressor 133 and cathode turbine 134 form an exhaust gas turbocharger 100. Different compressor technologies may be used here, for example, an exhaust gas turbocharger 100 in the form of a turbocharger including a screw compressor, etc. Furthermore, first fluid pumping device 133 may also be designed as a fluido-mechanically driven compressor 133, a fluido-mechanically driven pump 133, etc.

According to the present invention, a second fluid pumping device 33 may be driven by an electric motor 34, i.e., electromechanically; second fluid pumping device 33 may be driven exclusively by an electric motor (sole drive as primary drive). Electric motor 34 is preferably equipped with power electronics 35. In some exemplary embodiments, second fluid pumping device 33 may be driven, in addition to electromechanical drive 34, also similarly to fluid pumping device 133 by energy or enthalpy in cathode exhaust gas 6, i.e., fluido-mechanically (additional drive as secondary drive). In some exemplary embodiments, a single second fluid pumping device 33 or, in some exemplary embodiments, a plurality of or a majority of such second fluid pumping devices 33 are fluido-mechanically coupled into cathode supply path 31.

In some exemplary embodiments, second fluid pumping device 33 is designed as a cathode compressor 33 of an electric turbocharger 50 (only shown in FIGS. 2 through 6). A shared shaft or a transmission may be set up here between electric motor 34 (he only drive as the primary drive) and second fluid pumping device 33 for power transmission. Cathode compressor 33 and electric motor 34 form an electric turbocharger 50 (e-booster 50). In some exemplary embodiments, second fluid pumping device 33 may be additionally driven with the aid of a second cathode turbine (secondary drive, not illustrated in the drawing) situated in cathode exhaust gas path 32, optionally having a variable turbine geometry, as support, via a shared shaft or a transmission. Furthermore, second fluid pumping device 33 may also be designed as an electromechanically driven compressor 33, an electromechanically driven pump 33, etc.

According to the specific embodiment illustrated, cathode supply 30 may include a wastegate 37 or a wastegate line 37, which connects cathode supply path 31 or a cathode supply line to cathode exhaust gas path 32 or a cathode exhaust gas line, i.e., represents a cathode-side bypass for fuel cell 10. Wastegate 37 allows an operating pressure of cathode operating medium 5 to be briefly reduced in fuel cell 10, without slowing down the corresponding fluid pumping device 33, 133. A setting means 38 situated in wastegate 37 allows a volume flow rate of cathode operating medium 5 to be set, possibly bypassing fuel cell 10.

All setting means 24, 26, 38 of fuel cell unit 1 may be designed as regulatable, controllable or non-regulatable valves, dampers, throttles, orifices, etc. For insulating fuel cell 10 from surroundings 2, or for any other purpose, at least one additional setting means (not illustrated) may be situated in anode supply 20 and/or cathode supply 30, for example, in/on anode path 21, 22 or a line of anode path 21, 22, and/or in/on a cathode path 31, 32 or a line of cathode path 31, 32.

Fuel cell unit 1 also preferably includes a humidifier 39. Humidifier 39 is, on the one hand, situated in cathode supply path 31 in such a way that cathode operating medium 5 may flow through it. On the other hand, humidifier 39 is preferably situated in cathode exhaust gas path 32 in such a way that cathode exhaust gas 6 may flow through it. Humidifier 39 is situated in cathode supply path 31 preferably between first fluid pumping device 133 or second fluid pumping device 33 (see again FIGS. 2 through 6) and a cathode inlet of fuel cell 10 and cathode turbine 134 provided in cathode exhaust gas path 32 between a cathode outlet of fuel cell 10 and cathode exhaust gas path 32. A humidity transmitter (not illustrated) of humidifier 39 preferably includes a plurality of membranes, which are often designed either flat or in the form of hollow fibers, possibly as a hollow fiber body.

Different further details of the fuel cell system or fuel cell unit 1 or fuel cell 10/fuel cell stack 10, of anode supply 20 and/or cathode supply 30 are not illustrated in FIG. 1 for the sake of clarity. Thus, humidifier 39 may be bypassed on the side of cathode supply path 31 and/or of cathode exhaust gas path 32 with the aid of a bypass line (setting means). Furthermore, a turbine bypass line, bypassing cathode turbine 134 (setting means), may be provided on the side of cathode exhaust gas path 32.

Furthermore, a water separator may be installed in anode exhaust gas path 22 and/or in cathode exhaust gas path 32, with the aid of which a product water emerging from the corresponding partial reaction of fuel cell 10 may be condensed and/or separated, and possibly removed into a water collector for storage. Furthermore, anode supply 20 may alternatively or additionally have a humidifier 39 similar to that of cathode supply 30. Furthermore, anode exhaust gas path 22 may open into cathode exhaust gas path 32 or vice-versa; anode exhaust gas 4 and cathode exhaust gas 6 may possibly be removed via the shared exhaust gas system. In addition, in some exemplary embodiments, cathode operating medium 5 may flow through a charge air cooler 40 (see FIGS. 2 through 6) provided in/on cathode supply path 31.

In order to compensate for the disadvantage that, in the case where a majority of or a plurality of fluid pumping devices are used for cathode operating medium 5, and the plurality of or a majority of fluid pumping devices may be driven by electric motors, at least one of these fluid pumping devices referred to above and henceforth referred to as first fluid pumping device 133, is designed in such a way that it is drivable, as explained above, exclusively using energy recoverable from cathode exhaust gas 6. This first fluid pumping device 133 thus needs no additional electromotive drive, i.e., no electric power, for example, from fuel cell unit 1.

This first fluid pumping device 133 may be used at different points of fuel cell unit 1. Thus, first fluid pumping device 133 may be fluido-mechanically coupled into cathode supply path 31, for example, upstream from humidifier 39 and charge air cooler 40 (see FIGS. 5 and 6) in order to raise the temperature level of cathode operating medium 5 only moderately, or possibly in-between (see FIG. 4) or downstream (see FIGS. 2 and 3) of both. Furthermore, in some exemplary embodiments, first fluid pumping device 133 is connected fluido-mechanically in parallel to another fluid pumping device (see FIG. 6) in order to increase a mass flow rate of cathode operating medium 5.

Figure 2:
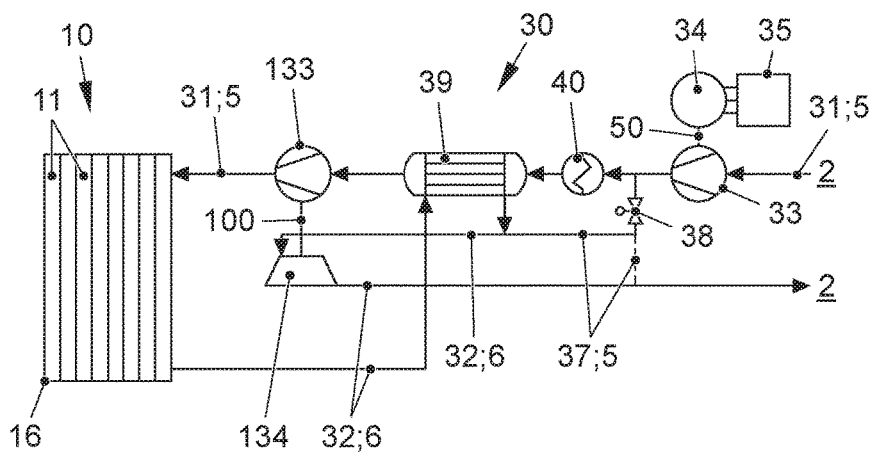
FIG. 2 shows a highly simplified block diagram of a first specific embodiment of a cathode supply of the fuel cell unit according to the present invention including an exhaust gas turbocharger system according to the present invention.

In the first specific embodiment shown in FIG. 2, proceeding from an air filter in fluid communication with surroundings 2 or an air filter box (neither shown) and viewed in a direction of fluid flow of cathode operating medium 5 (see arrows in cathode supply path 31), initially second fluid pumping device 33, then wastegate 37, charge air cooler 40, humidifier 39, first fluid pumping device 133, and fuel cell 10 are connected fluido-mechanically in series. Here, viewed from fuel cell 10 and in a direction of flow of cathode exhaust gas 6 (see arrows in cathode exhaust gas path 32), initially humidifier 39, and then cathode turbine 134, are fluido-mechanically connected in series; wastegate 37 may open into cathode exhaust gas path 32 between humidifier 39 and cathode turbine 134 or downstream from cathode turbine 134 (shown in dashed lines).

Figure 3:
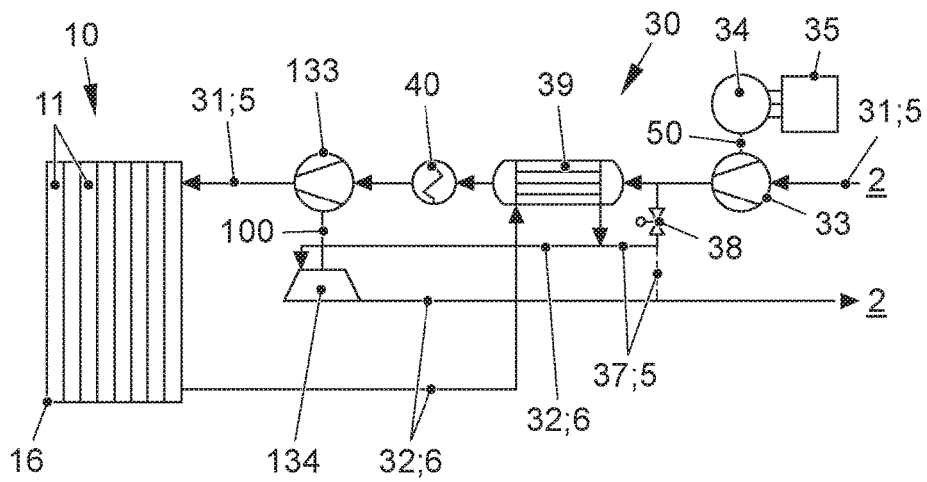
FIG. 3 shows a highly simplified block diagram of a second specific embodiment of the cathode supply according to the present invention including the exhaust gas turbocharger system according to the present invention.
Figure 4:
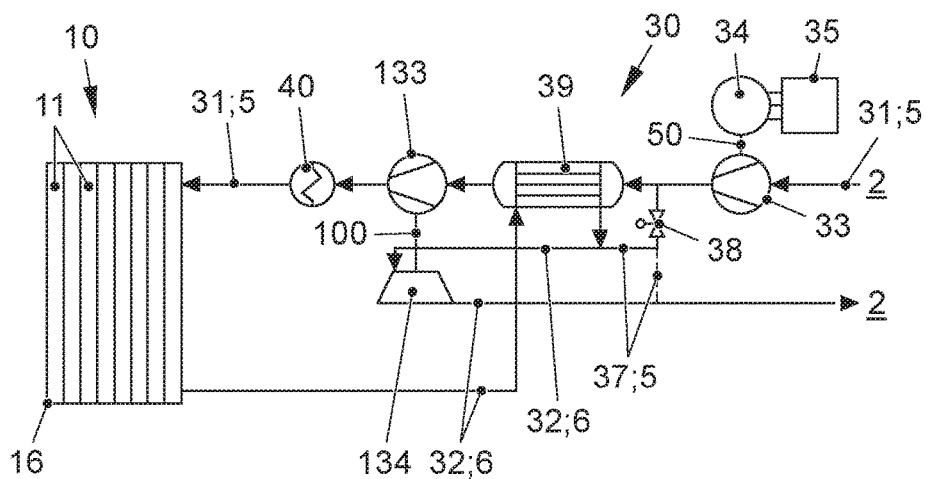
FIG. 4 shows a highly simplified block diagram of a third specific embodiment of the cathode supply according to the present invention including the exhaust gas turbocharger system according to the present invention.

The second specific embodiment shown in FIG. 3 is essentially structured as the first specific embodiment; however, charge air cooler 40 is fluido-mechanically coupled into cathode supply path 31 downstream from humidifier 39 and upstream from first fluid pumping device 133. The third specific embodiment shown in FIG. 4 is essentially structured as the first specific embodiment; however, charge air cooler 40 is coupled fluido-mechanically into cathode supply path 31 downstream from first fluid pumping device 133 and upstream from fuel cell 10.

In the preferred fourth specific embodiment shown in FIG. 5 again proceeding from the air filter box and viewed in a direction of flow of cathode operating medium 5 (see arrows in cathode supply path 31), initially first fluid pumping device 133, then wastegate 37, humidifier 39, second fluid pumping device 33, charge air cooler 40, and fuel cell 10 are connected fluido-mechanically in series. Proceeding from fuel cell 10 and viewed in a direction of flow of cathode exhaust gas 6 (see arrows in cathode exhaust flow path 32), initially humidifier 39, and then cathode turbine 134 are connected fluido-mechanically in series; wastegate 37 may open into cathode exhaust path 32 between humidifier 39 and cathode turbine 134 or downstream (not illustrated) from cathode turbine 134.

Figure 5:
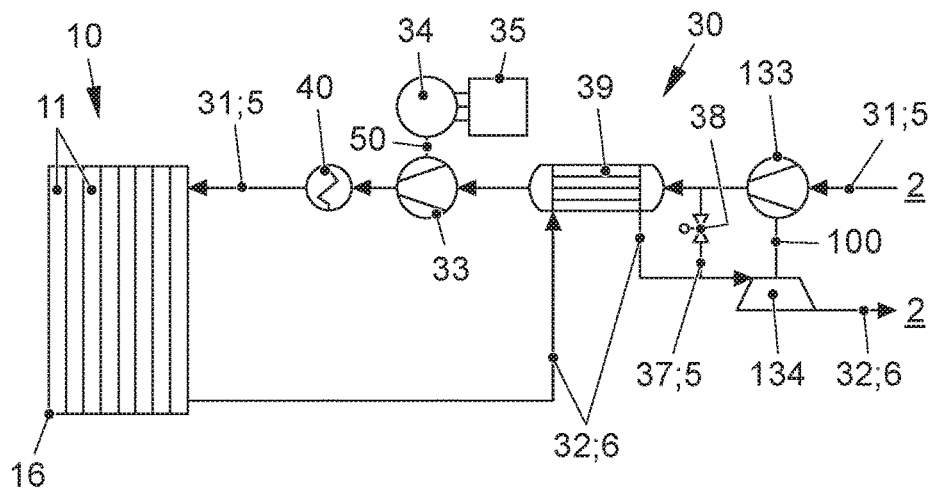
FIG. 5 shows a highly simplified block diagram of a fourth specific embodiment of the cathode supply according to the present invention including the exhaust gas turbocharger system according to the present invention.
Figure 6:
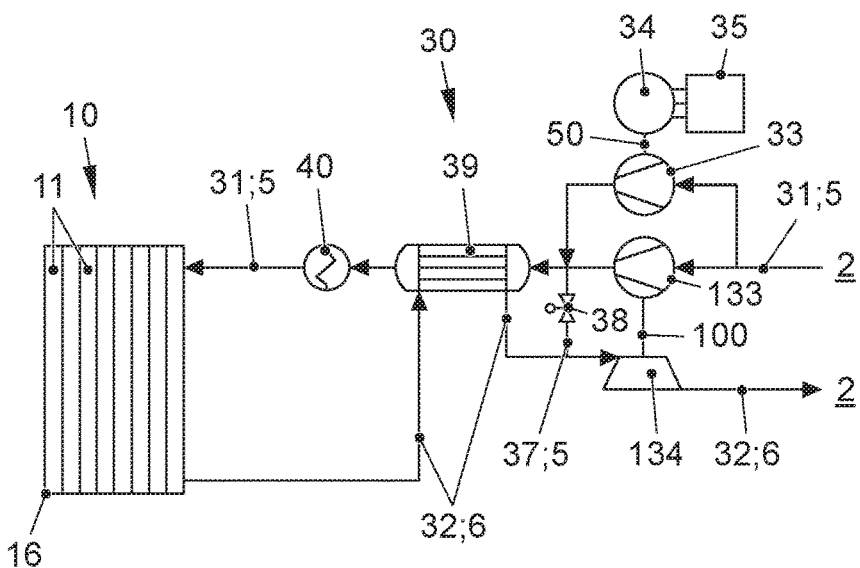
FIG. 6 shows a highly simplified block diagram of a fifth specific embodiment of the cathode supply according to the present invention including the exhaust gas turbocharger system according to the present invention.

FIG. 6 shows a fifth specific embodiment similar to that of FIG. 5, where second fluid pumping device 33 is no longer connected fluido-mechanically in series with first fluid pumping device 133, but fluido-mechanically in parallel thereto. In some exemplary embodiments first fluid pumping device 133 (see FIG. 6) may be fluido-mechanically bypassed with the aid of a bypass path, for example, a bypass line, into which second fluid pumping device 33 is fluido-mechanically coupled, first fluid pumping device 133 being provided in/on cathode supply path 31. This, of course, may be designed in reverse, i.e., first fluid pumping device 133 being provided in/on the bypass path and second fluid pumping device 33 in/on cathode supply path 31. Making the two fluid pumping devices 33, 133 fluido-mechanically equivalent, for example, with the aid of two T-branching pieces or two Y-branching pieces (neither illustrated) in cathode supply path 31 is also feasible.

Of course, other exemplary embodiments are also feasible; for example, a majority of exhaust gas turbochargers and/or a majority of electric turbochargers may be used. In some exemplary embodiments, an additional exhaust gas turbocharger is designed as above-described exhaust gas turbocharger 100. Furthermore, in some exemplary embodiments, another electric turbocharger is designed as above-described electric turbocharger 50. Furthermore, for example, charge air cooler 40 is omitted in some specific embodiments. In addition, another position of wastegate 37 or an opening of wastegate 37 in/on cathode supply path 31 and/or in/on cathode exhaust gas path 32 is possible.

According to the present invention, two or a plurality of fluid pumping devices 33, 133 connected in parallel or in series are used for cathode operating medium 5. At least one of fluid pumping devices 33, 133 here identified as first fluid pumping device 133, may be driven only by the enthalpy in cathode exhaust gas 6 of fuel cell 10. This is accomplished, for example, with the aid of exhaust gas turbocharger 100, which includes first fluid pumping device 133, in some exemplary embodiments a majority of such exhaust gas turbochargers 100 being provided in fuel cell unit 1. Electric turbocharger 50 is preferably connected to exhaust gas turbocharger 100 in series (see FIGS. 1 through 5) or in parallel (see FIG. 6). According to the present invention, a two-stage or multistage compression takes place in cathode supply path 31.

LIST OF REFERENCE NUMERALS 1 fuel cell unit of the fuel cell system, preferably for a vehicle including an electric motor, in particular, an electric traction motor
2 surroundings
3 fluid, operating medium, reactant, in particular, anode operating medium, fuel used, preferably hydrogen or hydrogen-containing gas mixture
4 fluid, exhaust gas, optionally including liquid water, in particular, anode exhaust gas
5 fluid, operating medium, reactant, in particular, cathode operating medium, preferably air
6 fluid, exhaust gas, optionally including liquid water, in particular, cathode exhaust gas, preferably exhaust air 10 fuel cell, fuel cell stack of fuel cell unit 1 or of the fuel cell system
11 individual cell including an anode electrode of the anode of fuel cell 10 and a cathode electrode of the cathode of fuel cell 10, individual fuel cell
12 anode space of an individual cell 11
13 cathode space of individual cell 11
14 membrane electrode assembly preferably including a polymer electrolyte membrane, as well as an anode electrode and a cathode electrode and, optionally, a carrier for each
15 bipolar plate, flow field plate, separator plate
16 stack housing of fuel cell 10
20 fuel cell supply, anode supply, anode circuit of fuel cell 10 or fuel cell stack 10
21 path, supply path, flow path, anode supply path
22 path, exhaust gas path, flow path, anode exhaust gas path
23 fuel storage, fuel tank with anode operating medium 3
24 setting means, regulatable, controllable, not regulatable, in particular, valve, damper, throttle, orifice, etc.
25 fuel recycling line
30 fuel cell supply, cathode supply, cathode circuit of fuel cell 10 or fuel cell stack 10
31 path, supply path, flow path, cathode supply path
32 path, exhaust gas path, flow path, cathode exhaust gas path
33 (second) fluid/air pumping device, compressor, cathode compressor, pump with motor 34
34 motor, electric motor, drive with electric motor, optionally including transmission
35 electronics, in particular, power electronics for motor 34
37 wastegate, wastegate line
38 setting means, regulatable, controllable, not regulatable, in particular, valve, damper, throttle, orifice, etc.
39 Humidifier with humidity transmitter
40 charge air cooler
50 electric turbocharger including second fluid pumping device 33 and motor 34, e-booster
100 exhaust gas turbocharger including first fluid pumping device 133 and turbine 134
133 (first) fluid/air pumping device, compressor, cathode compressor, pump of exhaust gas turbocharger 100
134 turbine with optionally variable turbine geometry, cathode turbine, expander of exhaust gas turbocharger 100

What is claimed is:

1. A cathode supply for a fuel cell of a fuel cell unit for a fuel cell system, the cathode supply comprising:
   a cathode supply path;
   a cathode exhaust gas path; and
   at least two fluid pumps for pumping a cathode operating medium for the fuel cell being fluido-mechanically coupled into the cathode supply path;
   at least one first fluid pump of the at least two fluid pumps being drivable by enthalpy in a cathode exhaust gas of the fuel cell.

2. The cathode supply as recited in claim 1 wherein at least one second fluid pump of the at least two fluid pumps is drivable by an electric motor, the second fluid pump being drivable exclusively by the electric motor or by the electric motor and, additionally, by a turbine.

3. The cathode supply as recited in claim 2 wherein the second fluid pump is drivable by the electric motor and, additionally, by the turbine, the turbine being a cathode turbine.

4. The cathode supply as recited in claim 1 wherein the cathode supply includes an exhaust gas turbocharger and an electric turbocharger, the exhaust gas turbocharger including the first fluid pump and the electric turbocharger including a second fluid pump of the at least two fluid pumps.

5. The cathode supply as recited claim 1 wherein the first fluid pump is designed as a first cathode compressor of the exhaust gas turbocharger.

6. The cathode supply as recited in claim 5 wherein the first cathode compressor is drivable by a cathode turbine of the exhaust gas turbocharger, and the cathode turbine is fluido-mechanically coupled into the cathode exhaust gas path.

7. The cathode supply as recited in claim 1 wherein two of the at least two fluid pumps are fluido-mechanically connected in series or in parallel.

8. The cathode supply as recited in claim 1 wherein the first fluid pump is fluido-mechanically coupled into the cathode supply path downstream from an air filter, a wastegate, the second fluid pump of the at least two fluid pumps, a humidifier, or a charge air cooler.

9. The cathode supply as recited in claim 1 wherein the first fluid pump is fluido-mechanically coupled into the cathode supply path upstream from a wastegate, a second fluid pump of the at least two fluid pumps, a humidifier, or an charge air cooler.

10. The cathode supply as recited in claim 3 wherein the cathode turbine is fluido-mechanically coupled into the cathode exhaust gas path downstream from a humidifier or a wastegate.

11. The cathode supply as recited in claim 3 wherein the cathode turbine is fluido-mechanically coupled into the cathode exhaust gas path upstream from a humidifier or a wastegate.

12. The cathode supply as recited in claim 1 wherein a second fluid pump of the at least two fluid pumps is fluido-mechanically coupled into the cathode supply path downstream from an air filter, a wastegate, a first fluid pump, a humidifier, or an charge air cooler.

13. The cathode supply as recited in claim 1 wherein a second fluid pump of the at least two fluid pumps is fluido-mechanically coupled into the cathode supply path upstream from a wastegate, the first fluid pump, a humidifier, or an charge air cooler.

14. The cathode supply as recited in claim 1 wherein a second fluid pump of the at least two fluid pumps is fluido-mechanically coupled into the cathode supply path downstream from a first fluid pump.

15. The cathode supply as recited in claim 14 wherein the first fluid pump is fluido-mechanically coupled into the cathode supply path upstream and the second fluid pumping device downstream from a humidifier.

16. The cathode supply as recited in claim 15 wherein the second fluid pump is provided upstream from a charge air cooler.

17. A fuel cell unit or system for a vehicle comprising the cathode supply as recited in claim 1.

18. The fuel cell unit or system for a vehicle as recited in claim 17 wherein the vehicle is an electric vehicle.

19. A vehicle comprising the cathode supply as recited in claim 1.

20. An electric vehicle comprising the cathode supply as recited in claim 1.

21. The fuel cell unit as recited in claim 1 wherein the first fluid pump is drivable exclusively fluido-mechanically by the cathode exhaust gas.

22. The fuel cell unit as recited in claim 1 wherein the first fluid pump is not driven by electricity.

* * * * *